(12) United States Patent
Nabata et al.

(10) Patent No.: US 7,153,565 B1
(45) Date of Patent: *Dec. 26, 2006

(54) LAMINATE FOR CONTAINER AND CONTAINER FOR ADSORBENT

(75) Inventors: Norikane Nabata, Osaka (JP); Yozo Nagai, Osaka (JP); Eizo Kawano, Osaka (JP); Takuya Maeoka, Osaka (JP)

(73) Assignee: Nitto Denki Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/487,239

(22) Filed: Jan. 20, 2000

(30) Foreign Application Priority Data

Jan. 22, 1999 (JP) ............................. P. 11-014173

(51) Int. Cl.
*B32B 3/26* (2006.01)

(52) U.S. Cl. ................... 428/316.6; 96/154; 55/487; 55/514

(58) Field of Classification Search ............. 428/316.6, 428/318.4, 319.1, 71, 76; 210/500.36, 348, 210/500.27
See application file for complete search history.

(56) References Cited

U.S. PATENT DOCUMENTS

| | | | |
|---|---|---|---|
| 4,212,733 A * | 7/1980 | Goto et al. ................... 210/36 |
| 5,108,474 A | 4/1992 | Riedy et al. ................... 55/485 |
| 5,234,751 A * | 8/1993 | Harada et al. ................ 442/50 |
| 5,248,461 A * | 9/1993 | Pluyter et al. ................ 264/41 |
| 5,538,545 A * | 7/1996 | Dauber et al. ................ 96/153 |
| 5,547,481 A * | 8/1996 | Herding et al. ................ 55/523 |
| 5,759,669 A * | 6/1998 | Casey et al. ................ 428/139 |
| 5,772,884 A * | 6/1998 | Tanaka et al. ......... 210/500.36 |
| 5,804,074 A * | 9/1998 | Takiguchi et al. ...... 210/497.01 |
| 5,916,671 A * | 6/1999 | Dauber et al. ........... 428/317.3 |
| 6,302,934 B1 * | 10/2001 | Nabata et al. ................ 55/486 |

FOREIGN PATENT DOCUMENTS

| | | |
|---|---|---|
| JP | 4-501229 | 3/1992 |
| JP | 9-276643 | 10/1997 |
| WO | 90/00438 | 1/1990 |
| WO | WO 95/20020 | 7/1995 |

OTHER PUBLICATIONS

Patent Abstracts of Japan, vol. 016, No. 389 (E-1250), Aug. 19, 1992 & JP 04 126353 A (Nitto Denko Corp), Apr. 27, 1992 Abstract.

* cited by examiner

*Primary Examiner*—Hai Vo
(74) *Attorney, Agent, or Firm*—Sughrue Mion, PLLC

(57) ABSTRACT

Polytetrafluoroethylene porous film is laminated with an ultra high molecular weight polyolefin porous film to realize excellent formability, dust collecting ability, and permeability that could not be attained by these porous films used alone. The laminate, which can be formed to prescribed shape if desired, is used to make a container for holding an adsorbent.

5 Claims, 4 Drawing Sheets

LAMINATE FOR CONTAINER AND CONTAINER FOR ADSORBENT

BACKGROUND OF THE INVENTION

1. Field of the Invention

This invention relates to a container holding an adsorbent, the container being made of a laminate having a polytetrafluoroethylene (hereinafter abbreviated as PTFE) porous film and to the laminate useful to make the container.

The present application is based on Japanese Patent Application No. Hei. 11-14173, which is incorporated herein by reference.

2. Description of the Related Art

In recent years a hard disk drive of a computer has been made more and more compact and increasingly gained in capacity, and improvement on reliability of the hard disk drive has been desired accordingly. Causes which may impair the reliability of a hard disk drive include damage of the disk drive head by suspended particles and contamination of the disk with vapor of organic matter. It has therefore been proposed to place a porous container containing an adsorbent in a hard disk drive thereby to remove the contaminants.

Since an adsorbent increases the adsorption efficiency with its surface area, it is used in the form of particles. A particulate adsorbent unavoidably contains very small particles and also develops fine dust due to friction among the particles. If such small particles and dust scatter outside the container, the adsorbent itself becomes a source of contaminants. Therefore it is desired that the porous container be made of such a material that does not let out fine particles or dust of the adsorbent.

Nonwoven fabric or mesh is generally used as a porous material for enclosing an adsorbent, but it is too coarse to block passage of fine particles. Hence a PTFE porous film has been proposed as a material of a porous container for a particulate adsorbent.

For example, Japanese Patent Publication No. Hei. 4-501229 discloses a porous container made of PTFE porous tubing having an average pore size of 0.1 to 1 μm. The container disclosed is an extruded tube with sealed ends. The extruded tube has a film thickness of about 250 to 1250 μm.

A container equipped with an ultra high molecular weight polyolefin porous film is also known, although the container is for putting a deliquescent adsorbent therein. For example, Japanese Patent Publication No. Hei. 9-276643 discloses a dehumidifier having on the upper part thereof an ultra high molecular polyethylene porous film. According to the disclosure, the ultra high molecular weight polyethylene porous film is used as a material that is permeable to moisture but impermeable to water. Having such a water-impermeable film, the container, even if it falls, does not leak the water generated from the deliquescent adsorbent. The ultra high molecular weight polyethylene porous film used here has a thickness of about 0.8 to 1.5 mm.

Compared with nonwoven fabric and the like, a PTFE porous film attains high efficiency in collecting fine particles. However, the PTFE porous tube as taught in Japanese Patent Publication No. Hei. 4-501229 is not easy to shape to fit the inside of a hard disk drive having an ever decreasing size so that the place inside the drive where such a container can be set may be limited. Further, the PTFE porous tube requires some film thickness to secure strength enough to hold an adsorbent, which restricts permeability, making it difficult to obtain sufficient adsorption performance.

SUMMARY OF THE INVENTION

An object of the present invention is to provide a porous material for forming an adsorbent container, which material has excellent formability and achieves high efficiency in collecting fine particles while allowing an adsorbent to exhibit satisfactory adsorption performance.

Another object of the invention is to provide a container holding an adsorbent which is made of the porous material.

The above objects of the invention are accomplished by a laminate for forming a space to hold an adsorbent, which comprises an ultra high molecular weight polyolefin porous film and a polytetrafluoroethylene porous film.

Having an ultra high molecular weight polyolefin porous film, the laminate of the invention is useful as a highly formable porous material. Having a PTFE porous film, the laminate exhibits excellent performance in collecting dust which may be generated from an adsorbent. Composed of both of these porous films, the laminate has sufficient strength even with the PTFE porous film having a reduced thickness thereby securing gas permeability.

The terminology "ultra high molecular weight" as used in the specification and claims is intended to mean "to have a molecular weight of more than 500,000 as measured by a viscosity method".

The PTFE porous film which can be used in the invention preferably has a thickness of 1 to 100 μm, particularly 5 to 50 μm.

The ultra high molecular weight polyolefin porous film used in the laminate is preferably an ultra high molecular weight polyethylene porous film. It is a preferred embodiment that the ultra high molecular weight polyolefin porous film comprises ultra high molecular weight polyolefin particles that are linked together to form pores among them. Such a porous structure can be confirmed by observation under, for example, a scanning electron microscope.

The container holding an adsorbent according to the invention is characterized by having the above-described laminate and holding an adsorbent. It is preferred that the container be made up of at least two parts each of the aforementioned laminate joined together. It is also preferred that at least one of the parts has a non-planar shape. Thus, the invention provides porous containers of various shapes, not limited to a specific shape like tubing.

Features and advantages of the invention will become understood from the following detailed description of the preferred embodiments described in conjunction with the attached drawings.

DETAILED DESCRIPTION OF THE PREFERRED EMBODIMENTS

Figure 1:
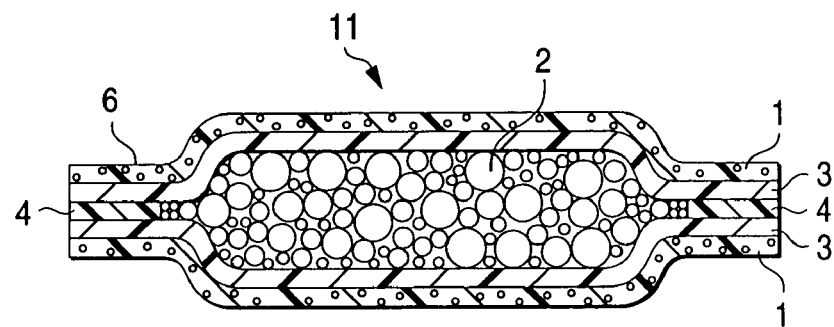
FIG. 1 is a cross sectional view of a first embodiment of the adsorbent container according to the invention.

A PTFE porous film and an ultra high molecular weight polyolefin porous film contained in a laminate according to the present invention will be described hereinafter.

It is preferred for the PTFE porous film to have a dust collection effciency as high as 99.999% or more for fine particles of 0.1 to 0.2 μm and/or a moisture permeability of 5000 g/m²/day or more and/or a pressure drop of 50 mmH$_2$O or less. Methods of measuring collection effciency, moisture permeability and pressure drop as referred to above will be described later.

The PTFE porous film can be prepared, for example, as follows. A pasty mixture of PTFE fine powder and a liquid lubricant is preliminarily molded. Any liquid lubricant that can wet the PTFE fine powder and is removable by extraction or on heating can be used. Useful liquid lubricants include hydrocarbon oils, such as liquid paraffin, naphtha, and white oil. The liquid lubricant is suitably used in an amount of 5 to 50 parts by weight per 100 parts by weight of the PTFE fine powder. The preliminary molding is carried out under a pressure that does not squeeze the liquid lubricant out of the paste.

The resulting preform is shaped to sheeting by paste extrusion or rolling, and the resulting sheet is stretched at least uniaxially to obtain a PTFE porous film. The stretching of the PTFE sheet is preferably conducted after the liquid lubricant is removed.

The gas permeability of the PTFE porous film is chiefly decided by the film thickness and the porosity. On the other hand, the collection effciency depends on the pore size and the like. The film thickness, porosity, and collection effciency of the PTFE porous film can be controlled by stretching conditions, such as stretch ratio. Balance between permeability and collection effciency should be taken into consideration in stretching a PTFE sheet. For example, porosity could be increased by increasing the stretch ratio, but too high a stretch ratio results in too large a pore size, failing to achieve the desired collection effciency.

In order to balance permeability and collection effciency, it is preferred for the PTFE porous film to have a thickness of 1 to 100 μm, particularly 5 to 50 μm, an average pore size of 0.2 to 1.5 μm, and a porosity of 60 to 95%.

The process for preparing the PTFE porous film is not limited to the aforementioned process. For example, the processes described in Japanese Patent Publication No. Hei. 10-30031 and WO94/16802 are also applicable.

The polyolefins constituting the ultra high molecular weight polyolefin porous film include ultra high molecular weight polypropylene and ultra high molecular weight polyethylene, with the latter being preferred.

It is preferred that the ultra high molecular weight polyethylene porous film comprises ultra high molecular weight polyethylene particles that are linked together to form pores among them. The polyethylene preferably has a molecular weight of 500,000 to 16,000,000.

The ultra high molecular weight polyolefin porous film can be prepared by, for example, a process comprising heating and pressing ultra high molecular polyolefin powder in a mold at or above the melting point of the polyolefin powder. The above-mentioned heating and pressing step is preferably preceded by preliminarily molding the powder below the melting point of the polyolefin powder. The preliminary molding pressure is preferably 0.3 to 40 kg/cm², and the molding pressure after the preliminary molding is preferably 10 g/cm² to 5 kg/cm². Upon being pressed at the melting point or higher temperatures, the ultra high molecular weight polyolefin particles are fusion bonded to each other while leaving voids among them to form a three-dimensional porous structure.

The ultra high molecular polyolefin powder to be used preferably has an average particle size of 15 to 300 μm, particularly 20 to 150 μm. The average pore size of the resulting porous film can be controlled by adjusting the particle size of the powder. A preferred average pore size is 10 to 200 μm.

The resulting porous block is sliced with a lathe and the like to obtain an ultra high molecular weight polyolefin porous film having a prescribed thickness, preferably 3000 μm or less, still preferably 30 to 200 μm. The porosity of the ultra high molecular polyolefin porous film is preferably 35 to 80%.

The process for preparing the ultra high molecular polyolefin porous film is not limited to the above-mentioned one. For example, the processes described in Japanese Patent Publication No. Hei. 5-66855, 7-55541, and 2-41218 are also useful.

The PTFE porous film and the ultra high molecular polyolefin porous film thus prepared are joined together by laminating. The method of laminating is not particularly restricted. For example, an adhesive material can be provided between the porous films, or the ultra high molecular polyolefin porous film can be heated to or above its melting point and fusion bonded to the PTFE porous film. Laminating is conveniently carried out by passing the PTFE porous film and the ultra high molecular weight polyolefin porous film through a pair of rolls heated to or above the melting point of the latter film.

The number of the porous films to be laminated and the order of laminating are not particularly limited. A suitable total thickness of the laminated sheet is 30 to 500 μm.

It is preferred that the laminate of the PTFE porous film and the ultra high molecular weight polyolefin porous film has a collection effciency of 99.999% or higher for dust of 0.1 to 0.2 μm in diameter, a moisture permeability of 5000 g/m²/day or more, and a pressure drop of 100 mmH$_2$O or less.

The flat laminated sheet as prepared can be used as a material for enveloping an adsorbent. If desired, the flat laminated sheet can be formed into a non-planar shape, in which an adsorbent can be put.

Forming the laminated sheet into a non-planar shape, i.e., a three-dimensional shape, can be conducted by pressing part of the sheet in the thickness direction while heating the sheet. For example, the laminated sheet is clamped in a ring frame, and a plug is forced into the sheet in the ring to give the sheet a three-dimensional shape corresponding to the contour of the plug and the manner of forcing the plug. The laminated sheet while being formed is preferably heated at 120 to 180° C. The laminated sheet can be formed into any three-dimensional shape that may hold an adsorbent, such as a shape having a cylindrical, hemispherical or domed part.

A container for holding an adsorbent is made of the non-planar or flat laminate. The container has at least one sheet of the laminate through which gas inside and outside the container can pass. The container is preferably made of two or more sheets of the laminate bonded together.

The manner of bonding the laminates is not particularly restricted as long as the functions of the laminates of letting outside contaminants in and of preventing leakages of dust, etc. are secured. For example, the laminates are bonded together by heat fusion or with an adhesive.

Thermoplastic resins, such as polyethylene and polypropylene, can be used as an adhesive. Specifically, a sheet of the thermoplastic resin is interposed between the joint surfaces of the laminates, followed by hot pressing.

In the container is held an adsorbent. Non-deliquescent adsorbents, such as activated carbon, silica gel, activated alumina, calcium sulfate, and calcium carbonate, are basically preferred. Deliquescent adsorbents, such as calcium chloride, are also applicable.

A porous container can be made by joining the peripheries of a pair of laminated sheets. One or both of the two laminated sheets to be joined may previously be given a prescribed three-dimensional shape to the shape of a hard disk drive, etc. where the container is fitted.

Conceivable shapes of the porous container will be illustrated specifically with reference to the accompanying drawings.

Figure 2:
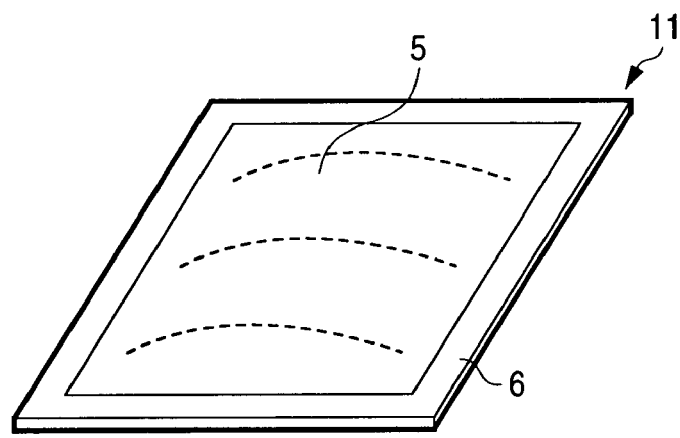
FIG. 2 is a perspective view of the container shown in FIG. 1.

FIGS. 1 and 2 show a cross sectional view and a perspective view, respectively, of one embodiment of the porous container according to the invention. The container 11 is made of a pair of laminated sheets which are rectangle in their plane view and each composed of a PTFE porous film 1 and an ultra high molecular weight polyolefin porous film 3 with the PTFE porous film 1 outside, and which are bonded together at all the peripheries. A thermoplastic resin sheet 4 is interposed as an adhesive layer between the laminated sheets at the peripheral joint 6, and an adsorbent 2 is held in the container 11. The adsorbent 2 adsorbs contaminants which enter through all the surfaces of the container 11 except the joint 6 (hereinafter sometimes referred to as a permeable part).

Figure 3:
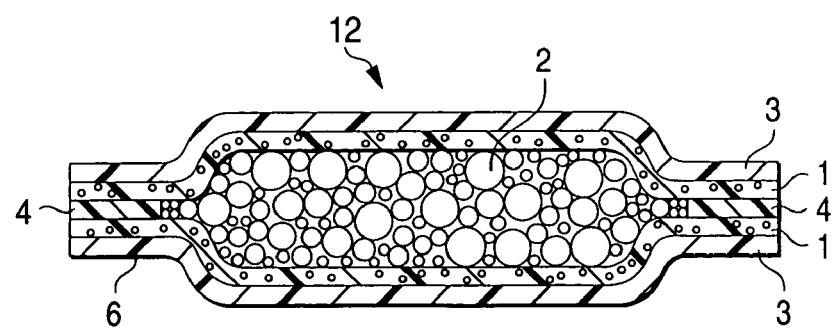
FIG. 3 is a cross sectional view of a second embodiment of the adsorbent container of the invention.

The ultra high molecular weight polyolefin porous film is excellent in that it generates little dust as compared with conventional materials, such as nonwoven fabric. Also, it hardly gives off organic gas. Therefore, it is also an effective embodiment that the laminated sheets are arranged with the ultra high molecular polyolefin porous film 3 outside to make the porous container 12 shown in FIG. 3. However, it is preferred to arrange the ultra high molecular polyolefin porous film inside according to the embodiment shown in FIG. 1 from the standpoint of preventing contamination of the outside environment.

Figure 4:
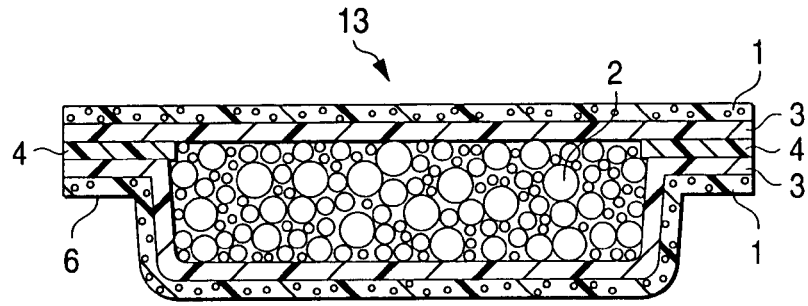
FIG. 4 is a cross sectional view of a third embodiment of the adsorbent container according to the invention.
Figure 5:
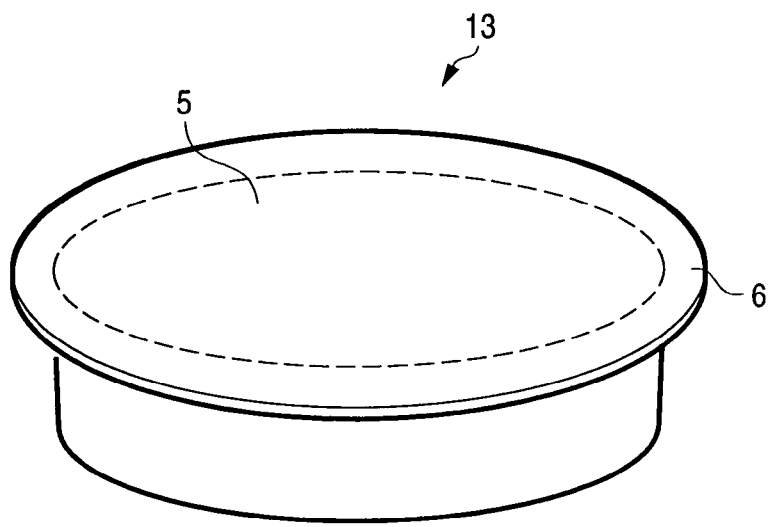
FIG. 5 is a perspective view of the container of FIG. 4.

In another embodiment, the porous container 13 shown in FIGS. 4 (cross sectional view) and 5 (perspective view) can be obtained by using one of the laminated sheets as previously formed into a non-planar shape. Similarly to the above embodiments, the container 13 is composed of a pair of the laminated sheets bonded via a thermoplastic resin sheet 4 and holds an adsorbent 2. As shown in FIG. 5, the surface of the container 13 comprises a permeable part 5 and a joint 6. In this embodiment, one of the laminated sheets has been given by previous forming a shape having a recess for holding an adsorbent and a fringe for bonding.

The invention will now be illustrated in greater detail by way of Examples, but it should be understood that the invention is not limited thereto. In Examples all the parts are by weight unless otherwise noted. Measurements of pressure drop, collection effciency, and moisture permeability were made as follows.

1) Pressure Drop

A porous film or a laminated sheet is set in a circular holder having an effective area of 100 cm$^2$. Air is made to pass through the laminated sheet at a rate of 5.3 cm/sec as adjusted with a flow meter. A pressure difference between the inlet side and the outlet side of the holder was measured with a liquid manometer to determine the pressure drop.

2) Collection Efficiency

A porous film or a laminated sheet is set in the same holder as used in (1) above. Air containing about 10$^7$ particles/liter of polydisperse particles of dioctyl phthalate (DOP) having a particle size ranging 0.1 μm to 0.2 μm was fed to the upstream side of the laminated sheet. The rate of permeation through the sheet was adjusted to 5.3 cm/sec. The downstream particle concentration was measured with a particle counter. The collection effciency can be calculated from the upstream and downstream particle concentrations according to equation (i).

$$\text{Collection efficiency (\%)} = [1 - (\text{downstream concentration/upstream concentration})] \times 100 \quad \text{(i)}$$

3) Moisture Permeability

A porous container is made of the laminated sheets, and a thoroughly dried adsorbent is sealed therein. The porous container is left to stand in a humidistat maintained at 90% RH and 40° C. for 24 hours. The moisture permeability is calculated from the weight gain of the container and contents according to equation (ii).

$$\text{Moisture permeability (g/m}^2\text{/day)} = [(\text{weight after adsorption} - \text{initial weight})/\text{effective surface area* of the container/number of days of standing}] \quad \text{(ii)}$$

* The surface area except the joint.

EXAMPLE 1

A hundred part of PTFE fine powder (Fluon CD-123, produced by ASAHI GLASS FLUOROPOLYMERS CO., LTD.) was mixed with 30 parts of a liquid lubricant (liquid paraffin), and the mixture was preliminarily molded under a pressure of 20 kg/cm$^2$. The resulting preform was extruded into a rod, which was passed through a pair of metal rolls to obtain a 0.2 mm thick continuous rolled sheet. The liquid lubricant was removed by extraction with trichloroethylene, and the sheet was wound around a tubular core into a roll.

The unrolled sheet was 10-fold stretched in the longitudinal direction at 320° C. by means of stretching rolls and then 30-fold stretched in the width direction at 90° C. by means of a tenter to obtain a PTFE porous film. The PTFE porous film, with its dimensions being fixed, was heat set at 390° C. for about 5 seconds to give a desired PTFE porous film. The resulting PTFE porous film had a thickness of 20 μm, an average pore size of 0.9 μm, a porosity of 95%, a pressure drop of 19 mmH$_2$O, a collection effciency of 99.9993%, and a moisture permeability of 9200 g/m$^2$/day.

Separately, 30 kg of ultra high molecular weight polyethylene powder (molecular weight: 5,000,000; melting point: 135° C.; average particle size: 120 μm) was packed in a mold having a bottom area of 1300 cm$^2$ and heated at 130° C. for 24 hours. The powder, as kept at that temperature, was compressed under a pressure of 10 kg/cm$^2$ to a pack height of 55 cm. The packed powder was further compressed at 160° C. and under a pressure of 50 g/cm².

The molded block was allowed to cool at room temperature (about 25° C.) for 48 hours and then removed from the mold. The resulting porous block 44 cm in diameter and 54 cm in height was sliced by a lathe to obtain an ultra high molecular weight polyethylene porous film having a prescribed thickness. The porous film thus prepared had a thickness of 200 μm, an average pore size of 35 μm, and a porosity of 60%.

The PTFE porous film and the ultra high molecular polyethylene porous film were jointed by passing through a pair of rolls heated at 150° C. to obtain a laminated sheet.

Two laminated sheets thus obtained were laid one on top of another with the PTFE porous film outside while inserting a polyethylene sheet therebetween at the peripheries. Silica gel was placed between the laminated sheets. In this state, the peripheries of the laminated sheets, where the polyethylene sheet was interposed, were press bonded together at 150° C. to make a porous container holding the adsorbent as shown in FIGS. 1 and 2. The container had a 50 mm-square plane view and an effective surface area (total surface area of the container through which gas can pass; hereinafter the same) of about 35 cm².

EXAMPLE 2

A porous container holding an adsorbent and having a 50 mm-square plane view and an effective surface area of about 35 cm² was prepared in the same manner as in Example 1, except that the laminated sheets were superposed with the PTFE porous film inside.

EXAMPLE 3

A cut piece of the laminated sheet prepared in Example 1 was clamped in a ring frame having an inner diameter of 55 mm kept at 150° C. One minute later, the laminated sheet as clamped was deformed by forcing a plug of 50 mm in diameter and 5 mm in height. The thus shaped laminated sheet and another cut piece of the laminated sheet were joined in the same manner as in Example 1 to obtain a porous container holding an adsorbent as shown in FIGS. 4 and 5. The container had a diameter (inclusive of the joint) of 50 mm and an effective surface area of about 31 cm².

COMPARATIVE EXAMPLE 1

A hundred part of PTFE fine powder (Fluon CD-123, produced by Asahi ICI Fluoropolyemrs) was mixed with 18 parts of a liquid lubricant (naphtha), and the mixture was preliminarily molded under a pressure of 20 kg/cm². The resulting preform was extruded into a tube, which was dried under heat to remove the liquid lubricant. The tube was 6-fold stretched in the longitudinal direction at 250° C. to prepare a PTFE porous tube having an outer diameter of 5 mm and a film thickness of 450 μm. Silica gel was put in the tube, and both ends of the porous container were press bonded at 400° C. The resulting porous container holding an adsorbent had a length of 50 mm and an effective surface area of 6 cm².

The porous containers holding an adsorbent prepared in Examples 1 to 3 and Comparative Example 1 and the porous laminates or the porous film used to make the containers were evaluated in accordance with the above-mentioned methods. The results obtained are shown in Table 1 below.

TABLE 1

| | Laminate | | Moisture Permeability |
| --- | --- | --- | --- |
| | Pressure Drop (mmH$_2$O) | Collection Efficiency (%) | of Container (g/m²/day) |
| Example 1 | 37 | 99.9997 | 7900 |
| Example 2 | 35 | 99.9999 | 8600 |
| Example 3 | 35 | 99.9995 | 7300 |
| Comparative Example 1 | ≧100 | 99.996 | 4600 |

As can be seen from Table 1, the laminates of Examples 1 to 3 exhibit a higher collection effciency (≧99.9995%) and yet a lower pressure drop (<40) than the porous film of Comparative Example 1. The porous containers of Examples 1 to 3 exhibit a moisture permeability of not less than 7000 g/m²/day.

EXAMPLE 4

The laminated sheet prepared in Example 1 was fabricated into containers having different shapes from those made in the foregoing Examples.

Figure 6:
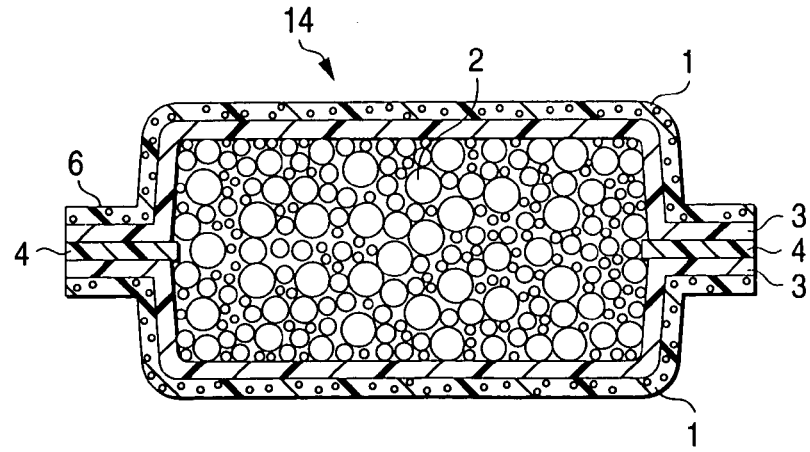
FIG. 6 is a cross sectional view of a fourth embodiment of the adsorbent container according to the invention.
Figure 7:
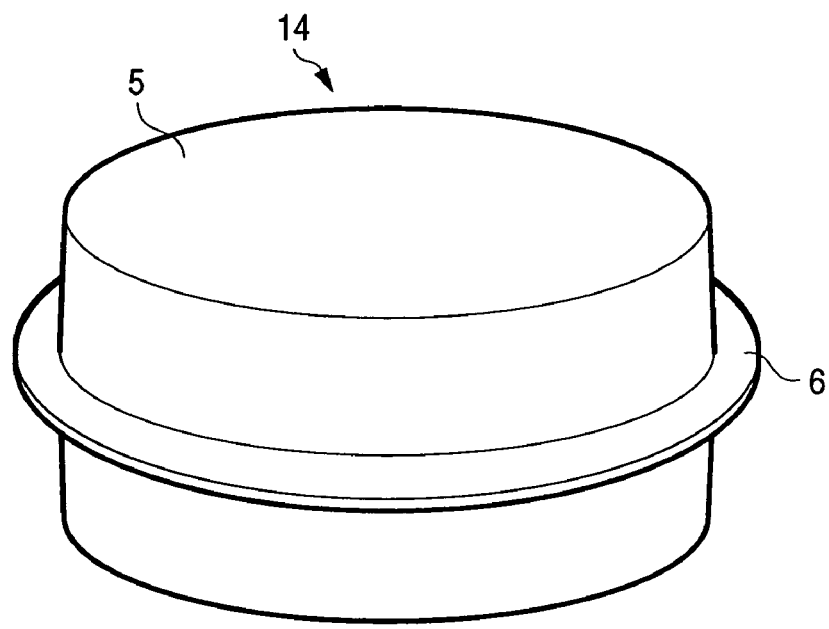
FIG. 7 is a perspective view of the container shown in FIG. 6.

A porous container having the shape shown in FIGS. 6 and 7 was made by joining two laminates both of which had previously been formed in the same manner as in Example 3.

Figure 8:
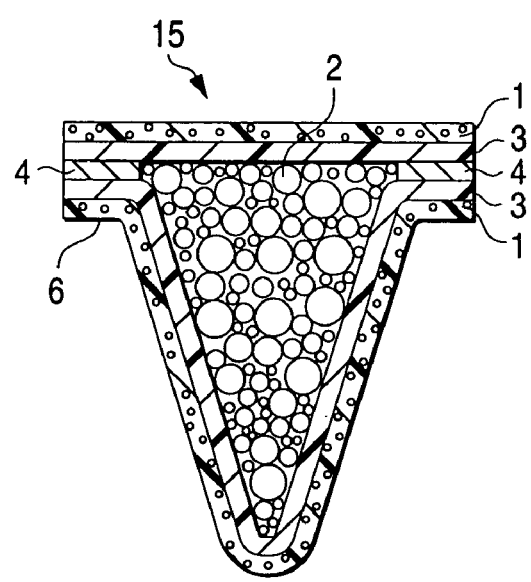
FIG. 8 is a cross sectional view of a fifth embodiment of the adsorbent container according to the invention.
Figure 9:
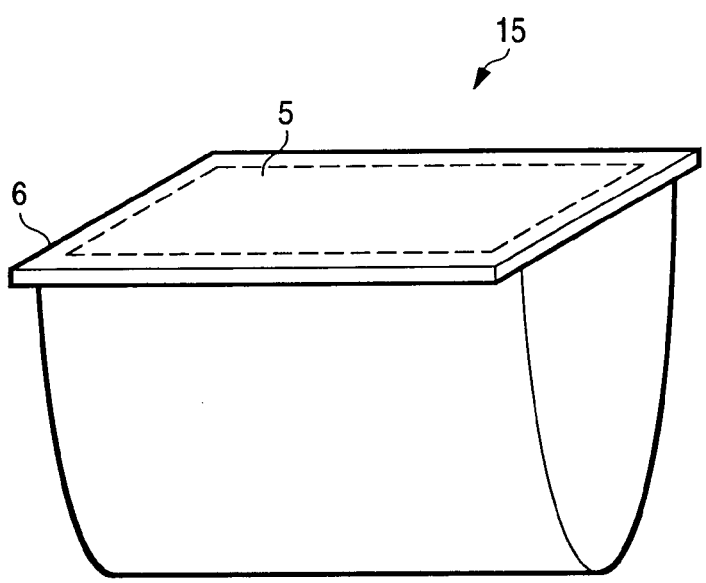
FIG. 9 is a perspective view of the container shown in FIG. 8.
Figure 10:
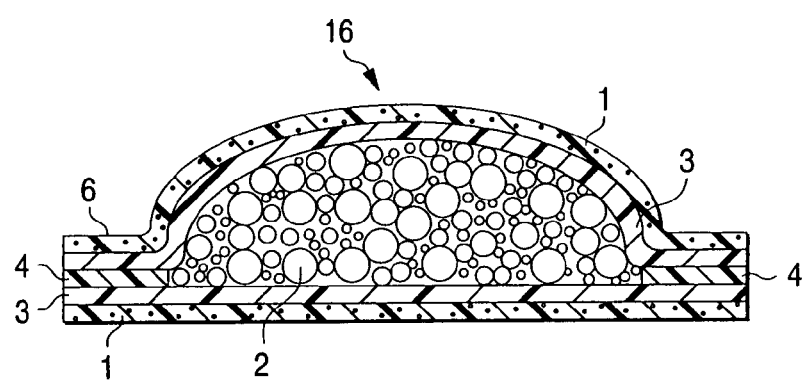
FIG. 10 is a cross sectional view of a sixth embodiment of the adsorbent container according to the invention.
Figure 11:
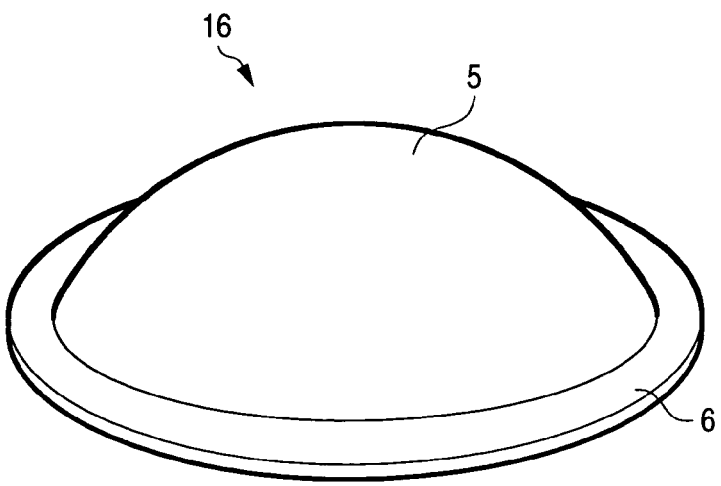
FIG. 11 is a perspective view of the container shown in FIG. 10.

A porous container having the shape shown in FIGS. 8 and 9 and a porous container having the shape shown in FIGS. 10 and 11 were made by joining a flat laminate and a three-dimensional-shaped laminate which was prepared in the same manner as in Example 3 but changing the contour of the plug.

Having a high melt viscosity, the ultra high molecular weight polyolefin porous film shows excellent shape retention in high temperature, especially at or above the melting point, and formability. Therefore, the laminate according to the invention can easily be formed into a variety of shapes other than those illustrated in the foregoing Examples.

According to the invention, a PTFE porous film laminated with an ultra high molecular weight polyolefin porous film has excellent formability and serves as an excellent material for making adsorbent containers because of its capability of collecting dust and permeability to outside contaminants. The laminate can be formed to prescribed shape to provide a container for an adsorbent. The container holding an adsorbent is particularly suited to use in a hard disk drive.

While the presently preferred embodiment of the present invention has been shown and described, it is to be understood that the disclosure is for the purpose of illustration and that various changes and modification may be made without departing from the scope of the invention as set forth in the appended claims.

What is claimed is:

1. A container holding an adsorbent, said container being made of at least two laminates joined to each other, wherein each laminate comprises an ultra high molecular weight polyolefin porous film and a polytetrafluoroethylene porous film, wherein the polytetrafluoroethylene porous film has an average pore size of 0.2 to 1.5 μm and a porosity of 60 to 95%, wherein said ultra high molecular weight polyolefin porous film has a structure in which ultra high molecular weight polyolefin particles are linked together, forming pores among them, said ultra high molecular weight polyolefin particles having an average particle size of 15 to 85 μm.

2. The container according to claim 1, wherein said ultra high molecular weight polyolefin porous film is an ultra high molecular weight polyethylene porous film.

3. The container according to claim 1, wherein said ultra high molecular weight polyolefin porous film is disposed at an interior side of said polytetrafluoroethylene porous film.

4. The container according to claim 1, wherein the ultra high weight polyolefin porous film comprises an ultra high weight polyethylene film having a molecular weight of 500,000 to 16,000,000.

5. The container according to claim 1, wherein an average pore size of the ultra high molecular weight polyolefin porous film is 10 to 200 μm.

\* \* \* \* \*

UNITED STATES PATENT AND TRADEMARK OFFICE
CERTIFICATE OF CORRECTION

PATENT NO. : 7,153,565 B1
APPLICATION NO. : 09/487239
DATED : December 26, 2006
INVENTOR(S) : Norikane Nabata et al.

It is certified that error appears in the above-identified patent and that said Letters Patent is hereby corrected as shown below:

On the title page item (73) should read:
Nitto Denko Corporation, Osaka (JP)

Signed and Sealed this

Fourteenth Day of August, 2007

JON W. DUDAS
*Director of the United States Patent and Trademark Office*